Aug. 28, 1956     O. H. SCHMITT     2,761,123
ORIENTATION SYSTEM
Filed April 21, 1944
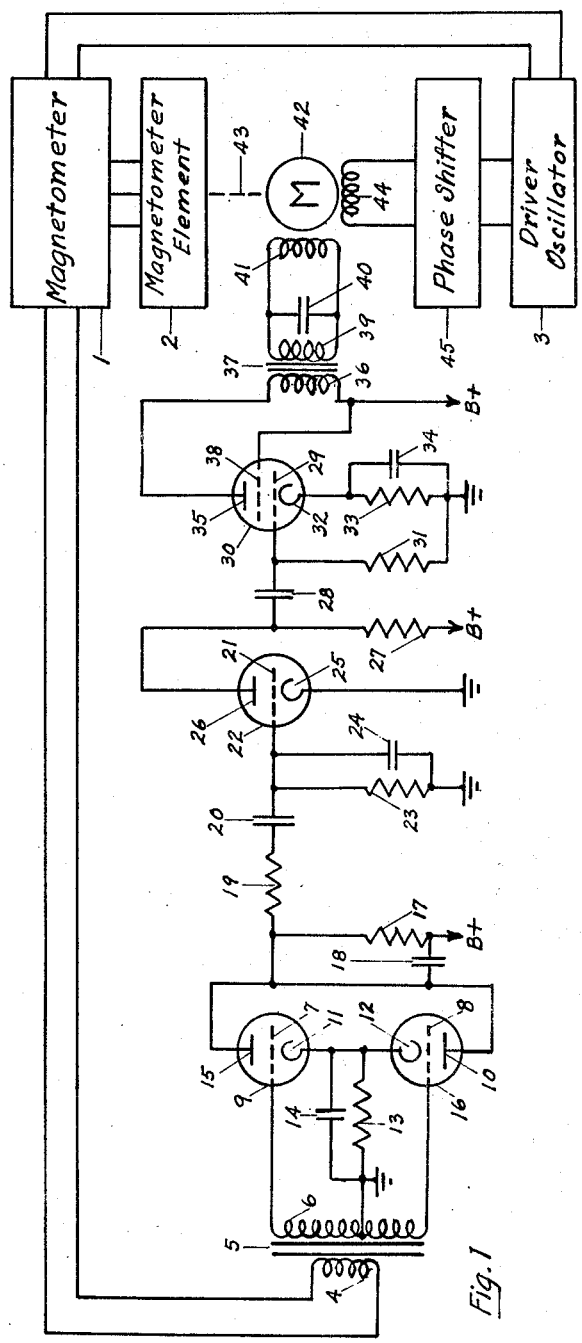
Fig. 1
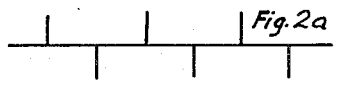
Fig. 2a
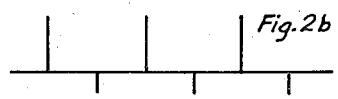
Fig. 2b
Fig. 2c
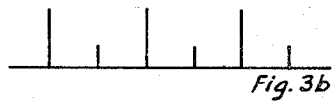
Fig. 3a
Fig. 3b
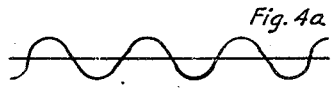
Fig. 3c
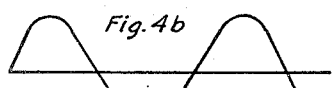
Fig. 4a
Fig. 4b
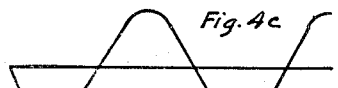
Fig. 4c
Time
Inventor
Otto H. Schmitt
By    P. E. Bush
Attorney

United States Patent Office 2,761,123
Patented Aug. 28, 1956

2,761,123
ORIENTATION SYSTEM

Otto H. Schmitt, Port Washington, N. Y., assignor to the United States of America as represented by the Secretary of the Navy Application April 21, 1944, Serial No. 532,144

6 Claims. (Cl. 340—187)

This invention relates to an improved orientation system, and more particularly to an orientation system adapted for maintaining the element of a magnetometer in a desired angular relation with respect to a relatively uniform magnetic field, such as for example the earth's magnetic field.

When employing a magnetometer to measure the strength of a magnetic field, it is desirable that the magnetometer element be maintained substantially in alignment with the field under observation. In the past, various arrangements have been proposed for insuring such alignment in spite of movements of the base supporting the magnetometer. For use in measuring the earth's magnetic field from aircraft, for example, the magnetometer element may be maintained in vertical orientation by means of a pendulum, which has the disadvantage that gravitational pull is supplemented by centrifugal force when the aircraft is maneuvered, or by means of a gyroscope with all the additional complications which such a device entails.

In the magnetic stabilization system disclosed in copending application Serial No. 529,003, filed March 31, 1944, Magnetic Stabilization System, D. G. C. Hare, now Patent 2,689,333, issued September 14, 1954, it is proposed to maintain orientation of the magnetometer element with respect to the magnetic field by utilizing a pair of auxiliary magnetometer elements mounted respectively perpendicular to each other and to the detector magnetometer element, and so arranged that deviations from predetermined positions with respect to the magnetic field of either of the auxiliary elements produce a driving force adapted for restoring the respective elements back to the desired position.

It is an object of the present invention to provide an improved orientation system which is especially adapted for use in the magnetic stabilization system in accordance with the above-mentioned copending application. The orientation system here disclosed is simpler in construction and more reliable in operation than previously disclosed arrangements for accomplishing substantially the same result. Employment of the present invention, therefore, provides orientation which is substantially faster and more accurate than that hitherto realized.

The present invention contemplates the use, for the orienting magnetometer, of an unbalanced magnetometer of the type disclosed in copending application Serial No. 516,612, filed January 1, 1944, now Patent 2,560,132, issued July 10, 1951, Unbalanced Magnetometers, Otto H. Schmitt. Such an unbalanced magnetometer provides an output signal comprising a series of pulses of alternate polarity, the degree of alignment with respect to the magnetic field being indicated by the difference in the heights of the positive and negative pulses. The present invention is directed specifically toward the effective utilization of such a magnetometer signal for automatically maintaining the magnetometer element in a desired angular relation with respect to the magnetic field.

In accordance with the present invention, means are provided for converting an input signal comprising a series of pulses of alternate polarity into an output signal having the same frequency as the input signal, whenever the alternate pulses are of unequal amplitude. Whether the output signal is in phase or in phase opposition with the input signal is determined by the polarity of the pulses of the input signal which have the greater amplitude. These means include a push-pull demodulator for inverting the pulses of one polarity of the input signal and for combining the inverted pulses with the pulses of opposite polarity of the input signal. These means also include means for shaping the combined pulses to provide a desired wave form for the output signal.

It will be understood that the arrangement of the present invention may be utilized for any purpose for which such a network is adapted without departing from the scope of the invention. The circuit arrangement here disclosed, however, finds special usefulness in those instances where its input terminals are supplied from an unbalanced magnetometer of the type referred to above, the magnetometer element of which in turn is mounted in a fixed position with respect to a detector magnetometer element, and where the output voltage is utilized to energize one of the field windings of a two-phase motor, the other field winding of which is energized from the same oscillator which drives the orienting magnetometer element and the shaft of which is suitably belted or otherwise connected to rotate the orienting magnetometer element about an axis perpendicular to its magnetic axis. For purposes of illustration, the employment of the invention in such a combination will be shown and described in the present disclosure.

For a better understanding of the invention, together with other and further objects thereof, reference is made to the following description taken in connection with the accompanying drawings, and its scope will be pointed out in the appended claims.

In the accompanying drawings:

Fig. 1 is a circuit diagram, partly in block form, of an orientation system in accordance with the present invention; and Figs. 2a, 2b, 2c, 3a, 3b, 3c, 4a, 4b and 4c show, in graphical form with a common time base, the voltages appearing at various points in the circuit of Fig. 1.

Referring now to Fig. 1 of the drawings, there is shown a magnetometer 1 having a magnetometer element 2, and being supplied with a driving voltage from driver oscillator 3. The output of magnetometer 1 is connected to primary winding 4 of transformer 5, center-tapped secondary winding 6 of which has its terminals connected respectively to control grids 7 and 8 of vacuum tubes 9 and 10, and having its center tap grounded. Cathodes 11 and 12, respectively of vacuum tubes 9 and 10, are connected together and, through resistor 13 shunted by capacitor 14, to ground. Plates 15 and 16, respectively of vacuum tubes 9 and 10, are connected together and, through resistor 17 shunted by capacitor 18, to a source of positive potential indicated by B+.

The junction of plates 15 and 16 of vacuum tubes 9 and 10 is also connected, through resistor 19 and capacitor 20 in series, to control grid 21 of vacuum tube 22. Control grid 21 is connected to ground through resistor 23 shunted by capacitor 24. Cathode 25 of vacuum tube 22 is grounded. Plate 26 of vacuum tube 22 is connected through resistor 27 to a source of positive potential indicated by B+, and is also connected, through capacitor 28, to control grid 29 of vacuum tube 30. Control grid 29 is connected through resistor 31 to ground. Cathode 32 of vacuum tube 30 is grounded through resistor 33 shunted by capacitor 34. Plate 35 of vacuum tube 30 is connected to one terminal of primary winding 36 of transformer 37, the other terminal of which is connected to a source of positive potential indicated by B+. Screen grid 38 of vacuum tube 30 is also connected to the same source of positive potential.

Secondary winding 39 of transformer 37 is shunted by capacitor 40, and is connected to field winding 41 of two-phase motor 42. Motor 42 is belted, as indicated diagrammatically by broken line 43, to magnetometer element 2. Field winding 44 of motor 42 is energized, through phase shifter 45, from driver oscillator 3.

In operation, let it first be assumed that magnetometer element 2 is in the desired position with respect to the magnetic field, and that this position is perpendicular thereto. In this case, the output of magnetometer 1 will comprise a series of pulses of alternate polarity but of equal amplitude, as shown in Fig. 2a. When this signal is applied to winding 4 of transformer 5, corresponding pulses are applied to control grids 7 and 8 of vacuum tubes 9 and 10. Since these vacuum tubes are biased almost to plate-current cutoff by means of cathode-bias resistor 13, each vacuum tube is responsive almost exclusively to positive pulses applied to its control grid. Furthermore, in view of the fact that control grids 7 and 8 are energized substantially in phase opposition whereas plates 15 and 16, being connected together, can operate only in the same phase, the signal appearing at plates 15 and 16 will comprise a series of pulses of the same polarity and of equal amplitude, and having twice the frequency of the pulses of either polarity of the input signal, as shown in Fig. 3a.

The signal at plates 15 and 16 is shaped by circuit components 17, 18, 19, 20, 23 and 24, after which it is amplified by vacuum tubes 22 and 30, so that the resultant signal voltage appearing at the terminals of secondary winding 39 of transformer 37 has approximately the wave form shown in Fig. 4a. When this double-frequency voltage is applied to field winding 41 of motor 42, the motor does not rotate due to the fact that winding 44 is energized by a current having the same frequency as the magnetometer output.

Consider now the operation of the system when the magnetometer element is rotated from its desired position in a direction such as to produce a magnetometer output having the form shown in Fig. 2b. In this case, the signal at plates 15 and 16 of vacuum tubes 9 and 10 comprises a series of pulses of one polarity but not of equal amplitude. As shown in Fig. 3b, the pulses are alternately large and small, with the result that a signal component having the same frequency as the magnetometer output is now present. This component is in phase with the magnetometer output. After shaping and amplification, the resultant voltage which is applied to winding 41 of motor 42 has approximately the wave form shown in Fig. 4b and is of fundamental frequency. It is to be noted that capacitor 40, in shunt with secondary winding 39 of transformer 37, is so chosen as to form with this winding a parallel circuit resonating at approximately the fundamental frequency, and thus greatly accentuating this component of the output signal. Under these conditions, windings 41 and 44 are energized by currents of the same frequency and, due to the operation of phase shifter 45, these currents are in quadrature. As a result, motor 42 will run in the proper direction and to the proper extent to rotate magnetometer element 2, by means of belt 43, back to its desired position.

The operation is similar, but of course in the opposite sense, when magnetometer element 2 is rotated in the opposite direction from its desired position. In this case, the performance is graphically represented by Figs. 2c, 3c and 4c. Comparison of these figures with Figs. 2b, 3b and 4b previously discussed, all of which are plotted to the same time base, will show that the signal appearing at plates 15 and 16 of vacuum tubes 9 and 10 has the same wave form as before but is displaced 180 degrees in phase with respect to the signal previously obtained. This phase displacement, which is carried through to the voltage applied to winding 41, causes motor 42 to rotate in the opposite direction, thus rotating magnetometer element 2 back to its original desired position.

In one successful embodiment in accordance with the invention, transformer 5 had an over-all step-up turns ratio of 25:1, and transformer 37 had a step-down turns ratio of 5:1. Vacuum tubes 9 and 10 together comprised a type 6SL7, vacuum tube 22 was half of a type 6SL7, and vacuum tube 30 was a type 6V6. Driver oscillator 3 operated at a frequency of 400 cycles per second, and the voltage at B+ was 180 volts. The following values of resistors and capacitors were employed:

| | | |
|---|---|---|
| Resistors 13 and 17 | megohms | 1.0 |
| Resistors 19 and 27 | do | 0.1 |
| Resistor 23 | do | 2.0 |
| Resistor 31 | do | 0.25 |
| Resistor 33 | ohms | 2,000 |
| Capacitor 14 | microfarads | 0.004 |
| Capacitor 18 | do | 0.01 |
| Capacitor 20 | do | 0.05 |
| Capacitor 24 | do | 0.005 |
| Capacitor 28 | do | 0.1 |
| Capacitor 34 | do | 20 |
| Capacitor 40 | do | 0.2 |

It will be understood that these constants are merely by way of example, and that they may be varied over wide limits without departing from the scope of the invention. It will also be understood that vacuum tubes 9 and 10 may comprise separate single tubes instead of one tube incorporating separate groups of electrodes within the same envelope, or that tubes of types other than those stated above may be employed. It will be obvious that the turns ratios of transformers 5 and 37 depend to a large extent respectively upon the particular magnetometer and the particular motor with which the orientation system is to be used, and therefore may be chosen to have any suitable values.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Means for converting an input signal comprising a series of pulses of alternate polarity into an output signal having the same fundamental frequency as said input signal and being in phase quadrature with said fundamental frequency of said input signal whenever said alternate pulses are of equal amplitude, and being in phase or in phase opposition with said input signal as determined by the polarity of the pulses of said input signal which have the greater amplitude, said means including a push-push demodulator for inverting the pulses of one polarity of said input signal and for combining said inverted pulses with the pulses of opposite polarity of said input signal, and means for shaping said combined pulses to provide a wave form having said fundamental frequency for said output signal, and resonant circuit means, tuned to said fundamental frequency, coupled to said means for shaping said pulses.

2. In a magnetometer rebalancing system comprising a magnetometer having an element and developing a signal which is a series of pulses of alternate polarity and of equal amplitude whenever said element is perpendicular in a given plane with respect to the magnetic field to be measured and of unequal amplitude whenever said element departs from perpendicularity in said plane, means responsive to said signal for maintaining said element substantially perpendicular to said field in said plane, said means comprising a two phase motor operatively coupled to said element and having first and second field windings, the first of said windings being energized by a first voltage having the same frequency as the fundamental frequency of said signal, the second winding being energized by a second voltage produced in response to said signal, means for producing said second voltage, said means comprising: a push-push demodulator for inverting the pulses of one polarity of said magnetometer signal, and for combining said inverted pulses with the pulses of opposite polarity of said magnetometer signal; means for shaping said combined pulses to provide an output signal having the same fundamental frequency as said magnetometer signal said output signal being in phase quadrature with said magnetometer signal when said alternate pulses are of equal magnitude, and in phase or in phase opposition with respect thereto in accordance with the polarity of said pulses having the greater amplitude when the magnitude of said alternate pulses is unequal; and means including a resonant circuit tuned to said fundamental frequency for supplying said output signal to the said second field winding of said two-phase motor; whereby said element is rotated in said plane in a direction and to an extent tending to restore said element to perpendicularity to said field in said plane whenever the amplitude of said pulses is of unequal magnitude.

3. Apparatus for converting an input signal consisting of a series of pulses of alternate polarity into an output signal having the same fundamentl frequency as the input signal, and being in phase quadrature therewith whenever the alternate pulses are of equal amplitude, and being in phase or in phase opposition with the input signal as determined by the polarity of the pulses of the input signal which have greater amplitude, said means comprising, means for inverting and combining the pulses of one polarity of the input signal with the pulses of opposite polarity of the input signal, means for shaping the combined pulses to provide a voltage comprising said fundamental frequency, and resonant circuit means, tuned to said frequency, coupled to said means for shaping said pulses to provide said output signal whereby the output signal is in phase, in phase opposition, or in phase quadrature with the input signal as is determined by the magnitude of the alternate pulses of the input signal.

4. In combination with a magnetometer having an element and developing a series of pulses of alternate polarity and unequal amplitude whenever said element departs from a plane perpendicular to the surrounding magnetic field, means including a two-phase motor for maintaining said element substantially perpendicular to said field, A. C. means for energizing said magnetometer and one of the phases of said motor at the same frequency and in any desired phase relation, and means for converting the unequal magnetometer pulses to alternating current energy of the same frequency and in a phase related to the difference between the pulse heights, and means for applying it to the second phase of said motor.

5. In a magnetometer system comprising a magnetometer having a movable element and having an output signal comprising a series of pulses of alternate polarity, the alternate pulses being of equal amplitude when said movable element is properly aligned with a magnetic field to be measured and being of unequal amplitude whenever said element is improperly aligned, the combination comprising means for converting said output signal into a voltage having the same frequency as said output voltage, whenever said pulses are of unequal magnitude, said voltage being in phase, or in phase opposition to said output signal, as determined by the polarity of the pulses of greater magnitude, said voltage being in phase quadrature with said signal when said pulses are of equal magnitude, said means comprising a push-push demodulator for inverting the pulses of one polarity of said input signal and for combining said inverted pulses with the pulses of opposite polarity of said input signal, means for shaping said combined pulses to provide a wave form having the fundamental frequency of said output signal, and a tuned output circuit resonant at said fundamental frequency, coupled to said shaping means.

6. A magnetometer system comprising a magnetomer having a movable element and having a signal output comprising a series of pulses of alternate polarity, said pulses being of equal amplitude whenever said element is properly aligned with a magnetic field to be measured and being of unequal amplitude whenever said element is improperly aligned, means for inverting the pulses of one polarity and for combining said pulses with the pulses of opposite polarity, circuit means for shaping said combined pulses to produce a voltage having a fundamental frequency equal to the frequency of said output signal, the phase of said voltage being in quadrature with said output signal when said alternate pulses are of equal magnitude, and in phase or in phase opposition, depending on the polarity of the pulses of greater amplitude, when said pulses are of unequal amplitude, and an output circuit tuned to said fundamental frequency coupled to said pulse shaping means.

References Cited in the file of this patent

UNITED STATES PATENTS

| | | |
|---|---|---|
| 1,474,726 | Meissner | Nov. 20, 1923 |
| 2,053,154 | La Pierre | Sept. 1, 1936 |
| 2,061,734 | Kell | Nov. 24, 1936 |
| 2,308,566 | Noxon | Jan. 19, 1943 |
| 2,406,882 | Young | Sept. 3, 1946 |
| 2,555,209 | Vacquier | May 29, 1951 |